United States Patent [19]

Ahrens

[11] 4,348,188

[45] Sep. 7, 1982

[54] PLAYGROUND DESIGN KIT AND METHOD OF USING THE SAME

[75] Inventor: Paul W. Ahrens, Grinnell, Iowa

[73] Assignee: Miracle Recreation Equipment Company, Grinnell, Iowa

[21] Appl. No.: 231,863

[22] Filed: Feb. 5, 1981

[51] Int. Cl.³ ............................................ G09B 29/00
[52] U.S. Cl. ..................................... 434/72; 434/416
[58] Field of Search ............. 40/594, 595; 46/DIG. 1; 273/157 A; 434/72, 73, 74, 79, 80, 94, 96, 155, 269, 365, 368, 386, 416, 428, 430

[56] References Cited

U.S. PATENT DOCUMENTS

| | | | |
|---|---|---|---|
| 2,586,017 | 2/1952 | Freedman | 46/DIG. 1 |
| 2,586,039 | 2/1952 | Heggedal | 40/594 |
| 3,924,879 | 12/1975 | Wright | 40/594 |
| 4,245,401 | 1/1981 | Riehle | 434/80 X |
| 4,250,642 | 2/1981 | Riehle | 434/79 X |

FOREIGN PATENT DOCUMENTS

| | | | |
|---|---|---|---|
| 280324 | 2/1965 | Australia | 40/594 |
| 662109 | 2/1965 | Belgium | 434/80 |
| 2365172 | 5/1978 | France | 434/72 |

*Primary Examiner*—Harland S. Skogquist

*Attorney, Agent, or Firm*—Zarley, McKee, Thomte, Voorhees & Sease

[57] ABSTRACT

A method of designing an outdoor playground complex is disclosed. Complex components are represented by reduced scale, two-dimensional projections of interchangeable playground devices. The projections are formed into pliable, transparent templates consisting of an electro-static vinyl material. The significant features viewable in each projection are lined on the templates. The components are stored on pliable sheets which releaseably adhere to the templates. The complex itself is designed by selecting possible components, removing the same from the storage sheet and placing the selected templates adjacent to each other on a transparent work surface which is adapted to releaseably adhere to the template.

The combination of transparent, lined templates and transparent work surface allows easy photocopying of the selected design with all significant features clearly set forth. The transparent work surface allows the design to be laid over scale drawings of play areas if desired. Additionally, blueprints can be made by placing the templates on a pliable worksheet, and covering the same with blueprint paper. The package is then run through a standard blueprinting machine.

11 Claims, 6 Drawing Figures

PLAYGROUND DESIGN KIT AND METHOD OF USING THE SAME

BACKGROUND OF THE INVENTION

The design of playground equipment complexes has been confined to conventional sketches or architectural drawings. Rearrangement and experiment therefor involve time consuming redrawing. In other areas of design, more flexibility was obtained by the use of interchangeable scale models. Such models have been used in the design and planning of layouts for offices, manufacturing plants and homes. But the scale models used were either bulky outlines made of magnetic materials which adhered only to metal plates, or were constructed of opaque materials and placed on opaque backgrounds. Further, all such prior design systems were limited to placing the models on grid like interior floor plans. Opaque models on opaque backgrounds made photocopying or overhead projection virtually impossible. Finally, no design system adaptable to outdoor areas has been disclosed.

SUMMARY OF THE INVENTION

The invention relates generally to a method of designing outdoor recreational complexes. The components of the complex are designed to interchangeably connect at selected junctions. A two dimensional, plan view in reduced scale of various play set components is projected onto an electro-static vinyl sheet. All important features of the projected view are displayed in dark lines. A template is cut from said sheet for each component by cutting along the edge of the projected views, leaving a uniform width border.

Said templates include marks to indicate support posts of components which have a portion thereof above ground level. The components are selected by the designer and releaseably secured adjacent to each other to a work surface by pressing the electro-static vinyl onto the surface. The work surface is a material adapted to releaseably adhere to the template material. The work surface is transparent and is either a pliable material or a rigid plate. The lined templates facilitate proper placement of the templates. The components can be easily peeled away from the surface and repositioned to present various arrangements until a suitable combination is achieved.

A play area scale plan may be placed under the work surface to more clearly depict a relationship of the complex and its location. Photocopying is readily accomplished due to the dark lined features displayed on the transparent materials. Similarly, the design materials are well suited to the use of light projectors. Blueprints are made by placing blueprint paper over the templates and running the combination through a standard blueprinting machine.

Storage of the components is facilitated by peeling them from the work surface and pressing the components onto a pliable storage sheet which is adapted to releaseably adhere to the template. The opposite side of the storage sheet is adapted not to adhere to the templates and therefore several worksheets can be stacked on top of one another without sticking together. The storage sheets are placed in a carry folder which includes a plurality of flaps which again are adapted to not adhere to the templates whereby several groups of storage sheets can be separately stored in the folder.

A transparent, electro-static vinyl title block can be used to label the design. It is applied and utilized just as the other templates. A design is enhanced by placing lettering and numerals to identify the type and dimensions of the components on the templates.

The principal object of the present invention is to provide a method of quickly displaying a variety of reduced scale playground complex plans.

A further object is to display all the significant lines and features of a selected view of said complex. A further object is to provide a method which allows ease of photocopying of all of said plans.

A further object is to provide a method which allows ease of blueprinting said plans.

A further object is to provide a method which allow ease of projecting said plans with light projectors.

A further object is to provide reduced scale models of interchangeable components of said plans which can be quickly and easily aligned with similar components.

DESCRIPTION OF THE PREFERRED EMBODIMENT

A transparent sheet composed of an electro-static vinyl is selected. Ad-heer, manufactured by Tekra Corp. of Wisconsin, is recommended. Ad-heer will releaseably secure to any very smooth, dry, clean surface with firm pressure. Very smooth plastic, glass or metal are common surfaces.

Plan views of various pieces of playground equipment are projected in reduced scale (preferably one-fourth inch to one foot) onto said transparent sheet (not shown). The two dimensional projections include lines marking the significant features of each piece. The pieces are designed as interchangeable components which connect only parallel to or at right angles to the longitudinal axis of other components, with the lined features serving as a further guide.

Templates (see FIG. 1, items A, B, C, D, E, F, G, H and I) of said projections are cut from said sheet including a small, uniform width border (not shown) around each piece's darkened outline. The templates are stored on a pliable storage sheet 10 adapted to releaseably adhere to said pressure sensitive material.

Figure 1:
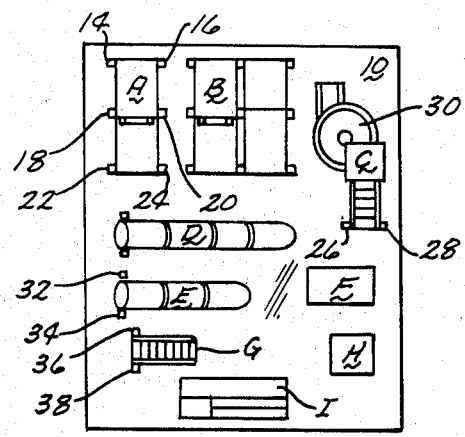
FIG. 1 is a plan view of templates on a storage sheet.

The nine items depicted in FIG. 1 are given merely by way of example, and it should be understood that for various scales and storage sheet sizes, any number of components could be displayed.

Figure 2:
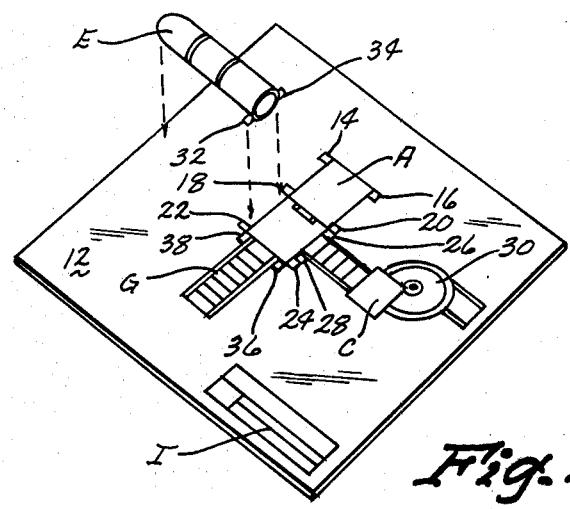
FIG. 2 is a perspective view of a rigid work surface with a proposed playground complex design being completed.

In order to design a playground complex, the desired components represented by corresponding templates are selected and placed on a transparent work surface 12 (see FIG. 2). As with the storage surfaces, the work surface can be composed from any materials adapted to releasably adhere to the templates. Further, the work surface can be a rigid plate (as seen in FIG. 2), or a pliable sheet. The latter form is advantageous with respect to blueprinting and will be discussed further below. A template is positioned on the work surface by simply peeling the same from the storage sheet 10 and pressing it firmly against work surface 12.

If a particular component would require support poles, the template for such a component includes squares indicating the location of such poles. Template A represents a double sized deck with six primary supporting posts 14, 16, 18, 20, 22 and 24. Template C represents a stairway supported at the height of deck A by posts 26 and 28. The stairway of template C leads to a slide with a circular chute 30. Template E represents a chute which is supported at the height of the deck of template A by posts 32 and 34. The chute of template E then angles downward to the ground. Template G is a staircase which rises to the height of the deck of template A at posts 36 and 38. Template I represents a title block. Templates B, D, F and H are illustrative of the manner in which other components are stored.

Figure 3:
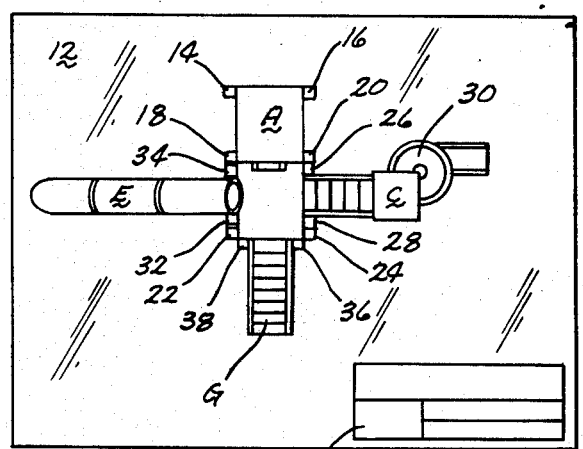
FIG. 3 is a plan view of FIG. 2.

To correctly align two selected templates (see FIGS. 2, 3 and 4), a first template A is pressed against work surface 12. Subsequent templates (C and G) are connected parallel to or at right angles to template A. Care must be taken to adjoin templates only at points which are at the same height. A chart (not shown) summarizing allowable template combinations is recommended to facilitate proper template selection. The height of each component or portion of a component can also be indicated numerically on the templates. In FIG. 2, templates A, C and G are already positioned with templates C and G abutting template A. Template E in FIG. 2 is about to be positioned adjacent template A. FIG. 3 shows template E positioned in the correct relationship to template A. The darkened lines of each template allow designers to accurately position edges and other components features. Note that said template borders will overlap, but in rare cases (as in the case of the circular end of template E), template features may slightly overlap. If irregular shaped templates were utilized or perspective views employed, the templates would not necessarily be placed parallel or at right angles to one another.

Figure 4:
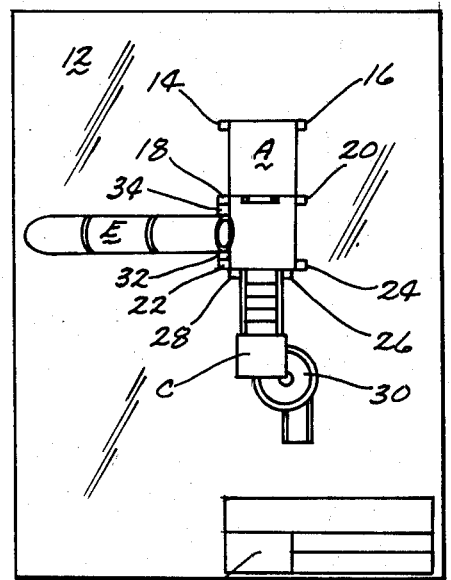
FIG. 4 is a plan view of FIG. 3 with the templates repositioned.

If the complex arrived at is not suitable, one simply peels selected templates away from work surface 12 and repositions them or removes them from the design. FIG. 4 indicates the removal of template G from FIG. 3, and the substitution of template C for the same. Further, FIG. 4 depicts a rotation of this new combination of templates A, C and E, as well as title block I, through 90° during its repositioning on surface 12.

Since the templates and work surface may be of a washable material, transparency markers can be readily used to label the title plate I or any other point of interest on the templates or work surface.

Figure 5:
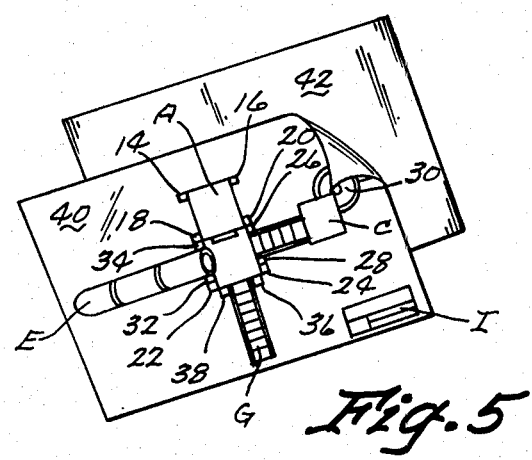
FIG. 5 is a perspective view of an arangement for blueprinting a selected design.

Once a suitable design is obtained, photocopying is accomplished by simply placing an opaque sheet under the work surface and placing the combination face down on a standard copying machine. Similarly, blueprints are made (see FIG. 5) by using a pliable acetate work surface 40 and overlaying the same with blueprint paper 42. The combination is passed through a standard blueprinting machine.

Since the work surface is transparent, and the templates lined, the work surface can be placed on an overhead projector and the design projected onto a wall or screen.

Figure 6:
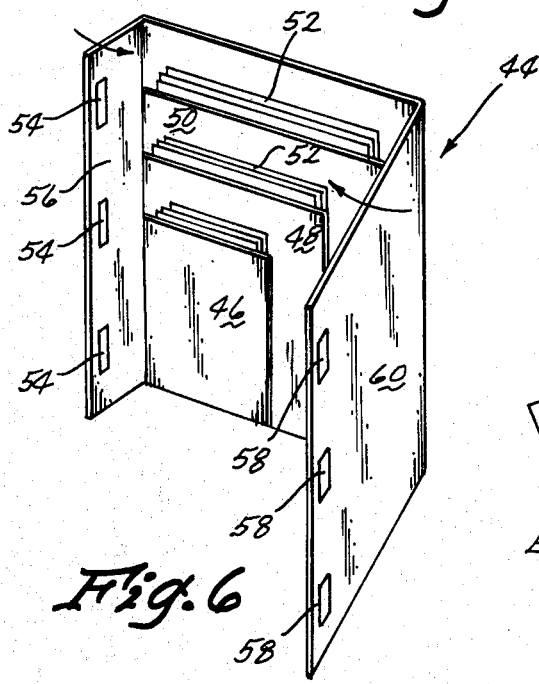
FIG. 6 is a perspective view of a carry folder.

When a permanent copy has been made of the selected design, the design is disassembled by peeling the templates off the work surface. The templates are placed back on the storage sheet 10 and put in a plastic folder 44 (see FIG. 6) which is composed of a material that will not adhere to the templates. A flexible plastic or vinyl with a rough surface is recommended. Additionally, flaps 46, 48 and 50 are also composed of a material which will not adhere to the templates. Thus, stacks of storage sheets 52 can be separated by said flaps without the flaps sticking to the templates or the storage sheets.

Three Velcro strips 54 are attached to the inside of a closing flap 56. Strips 52 then secure to registered Velcro strips 58 which are secured to the exterior of folder cover 60.

The surface of storage sheet 10 opposite the templates should be composed of a material which will not adhere to electro-static vinyl. This will insure that if several storage sheets are stacked, the overlying storage sheet will not adhere to the underlying templates. The storage sheets should never be stacked with templates facing one another.

A drawing of a playground area made to the same scale of the templates may be placed under the work surface in order to show the relationship of the complex to the playground. If the playground is depicted on a transparent, pliable material, photocopying, blueprinting, or light projection of the complex-playground combination is accomplished in the manner indicated above.

A material coated on one side with a pressure sensitive layer could be used in lieu of said electro-static vinyl for the templates. However, pressure sensitive materials are coated with an adhesive, thus adhesive residue would eventually build up on the work surfaces. Thus, electro-static vinyl, which utilizes no adhesive and can virtually be reused an unlimited number of times, is preferred.

From the above description, it is seen that the present invention accomplishes at least all of its stated objectives.

What is claimed is:

1. A method of designing an outdoor playground complex comprising:
   projecting selected views of interchangeable components of said complex onto two dimensions in reduced scale, including the display of the significant features of said components visible in said view;
   transposing said views onto a substantially transparent material adapted to releaseably adhere to substantially smooth, dry, clean surfaces;
   cutting templates out of said material which follow the outline of said views;
   securing selected templates in a proposed arrangement to a surface adapted to releaseably adhere to said material;
   removing said templates from said surface; and
   repositioning said templates in further proposed arrangements;
   whereby said components can be variously arranged to form a scale plan of a desired complex.

2. The method of claim 1 wherein said projections are transposed onto a pliable, substantially transparent material adapted to releaseably adhere to substantially smooth, dry, clean surfaces.

3. The method of claim 1 wherein said surface is substantially transparent whereby said scale plan of said complex can be readily displayed with a light projector.

4. The method of claim 3 wherein said templates are secured to a pliable surface adapted to releasably adhere to said material, whereby said scale plan of said complex can be readily blueprinted or displayed with a light projector.

5. The method of claim 1 wherein said projections include plan views of each component.

6. The method of claim 5 wherein said plan views include indicia of vertical support posts for components with portions above ground level and indicia of the height of said portion, whereby said templates are positioned adjacent one another only at points of equal height.

7. The method of claim 5 wherein said projections include a longitudinal axis and said templates are adapted to interconnect only parallel to or at right angles to the longitudinal axis of other components.

8. The method of claim 1 further including storing said templates on pliable backing sheets adapted to releaseably adhere to said templates on one surface, and adapted not to adhere to said templates on the reverse surface, whereby said templates can be releaseably affixed to said sheets and said sheets stacked on top of each other without underlying templates adhering to overlying sheets.

9. The method of claim 8 further including placing said pliable backing sheets with templates stored thereon in a multi-sectioned folder wherein said sections are separated by flaps comprised of a material adapted not to adhere to said templates or said backing sheets, whereby selected templates and backing sheets can be stored in and separated from other templates and backing sheets without adhering to said folder.

10. The method of claim 1 or 9 wherein said projections are transposed onto a substantially transparent material which consists of electro-static vinyl.

11. The method of claim 9 wherein said flaps are comprised of a rough textured vinyl.

* * * * *